United States Patent
Chung et al.

(10) Patent No.: US 9,186,832 B2
(45) Date of Patent: Nov. 17, 2015

(54) HEAT DISSIPATING ASSEMBLY AND MOLD HAVING THE SAME

(71) Applicant: Foxconn Technology Co., Ltd., New Taipei (TW)

(72) Inventors: Ming-Hsiu Chung, New Taipei (TW); Nien-Tien Cheng, New Taipei (TW)

(73) Assignee: Foxconn Technology Co., Ltd., New Taipei (TW)

( * ) Notice: Subject to any disclaimer, the term of this patent is extended or adjusted under 35 U.S.C. 154(b) by 117 days.

(21) Appl. No.: 13/902,867

(22) Filed: May 27, 2013

(65) Prior Publication Data
US 2013/0323348 A1    Dec. 5, 2013

(30) Foreign Application Priority Data
Jun. 4, 2012    (TW) .............................. 101119896 A

(51) Int. Cl.
  *A23P 1/00* (2006.01)
  *B29C 45/73* (2006.01)
  *F28D 15/02* (2006.01)

(52) U.S. Cl.
  CPC ............ *B29C 45/7331* (2013.01); *F28D 15/02* (2013.01); *F28D 15/0275* (2013.01)

(58) Field of Classification Search
  None
  See application file for complete search history.

(56) References Cited

U.S. PATENT DOCUMENTS

2005/0061484 A1* 3/2005 Hendricks et al. ........ 165/104.21
2005/0276875 A1* 12/2005 Lee .............................. 425/144

* cited by examiner

*Primary Examiner* — Joseph S Del Sole
*Assistant Examiner* — John Robitaille
(74) *Attorney, Agent, or Firm* — Novak Druce Connolly Bove + Quigg LLP

(57) ABSTRACT

A heat dissipating assembly of a mold includes an angular pin, a heat pipe, and a liquid passage passing through the angular pin. The angular pin defines a receiving chamber therein. The liquid passage passes through a lower portion of the receiving chamber of the angular pin. The heat pipe includes a condensing section, an evaporation section, and a connecting section interconnecting the condensing section and the evaporation section. The evaporation section is embedded in an upper portion of the receiving chamber opposite to the lower portion. The condensing section is located in the lower portion of the receiving chamber. A mold having the heat dissipating assembly is also provided.

20 Claims, 3 Drawing Sheets

HEAT DISSIPATING ASSEMBLY AND MOLD HAVING THE SAME

BACKGROUND

1. Technical Field

The present disclosure relates generally to molding technology, and more particularly to a heat dissipating assembly of a mold and a mold having the heat dissipating assembly.

2. Description of Related Art

A manufacturing mold usually includes a male die and a female die, which when engaged together cooperatively define a molding cavity therebetween. During an injection molding process, a molten die material is injected into the molding cavity from a nozzle. This increases the temperature of the mold and may cause overheating. In order to shorten the molding time and prolong the working life of the mold, heat generated by the mold must be quickly dissipated during the molding process.

What is needed, therefore, is a heat dissipating assembly and a mold having the heat dissipating assembly which can overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
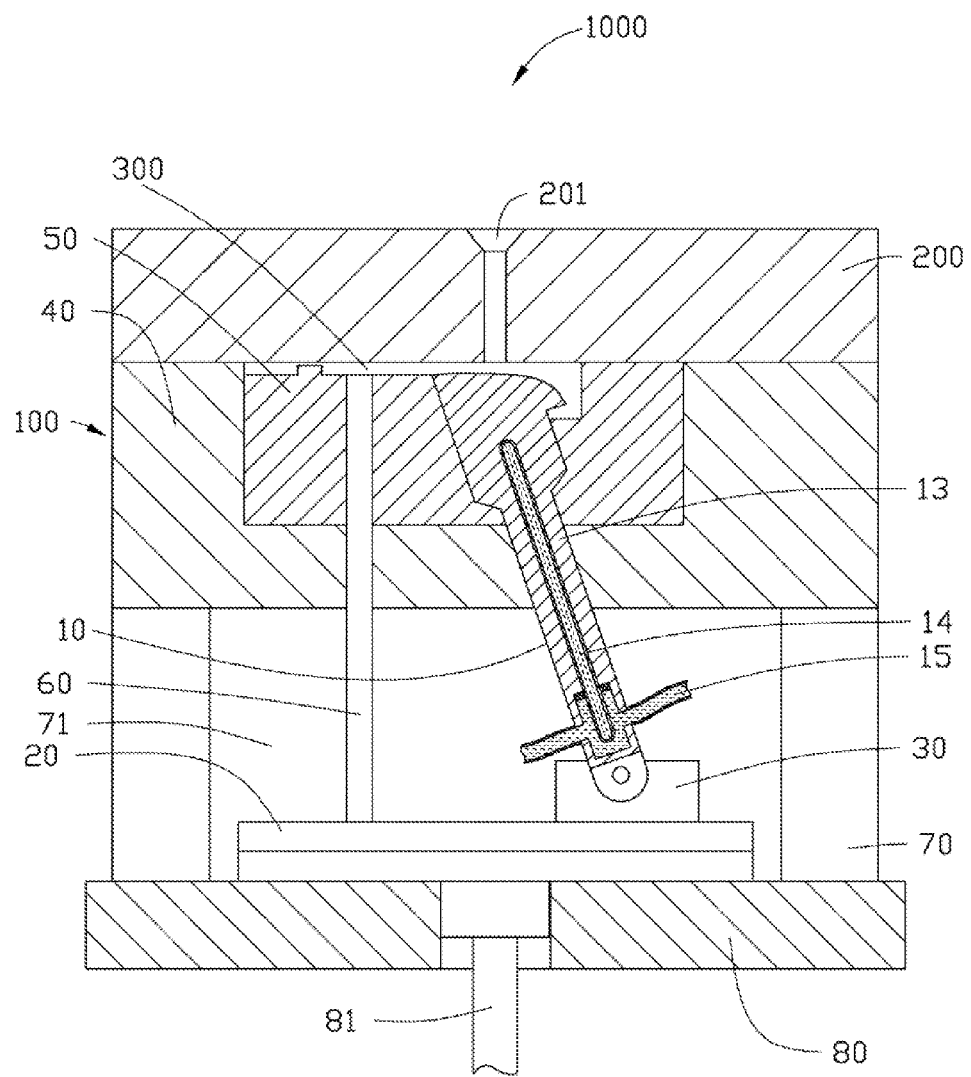
FIG. 1 is a schematic, cross sectional view of a mold in accordance with an exemplary embodiment of the present disclosure.
Figure 2:
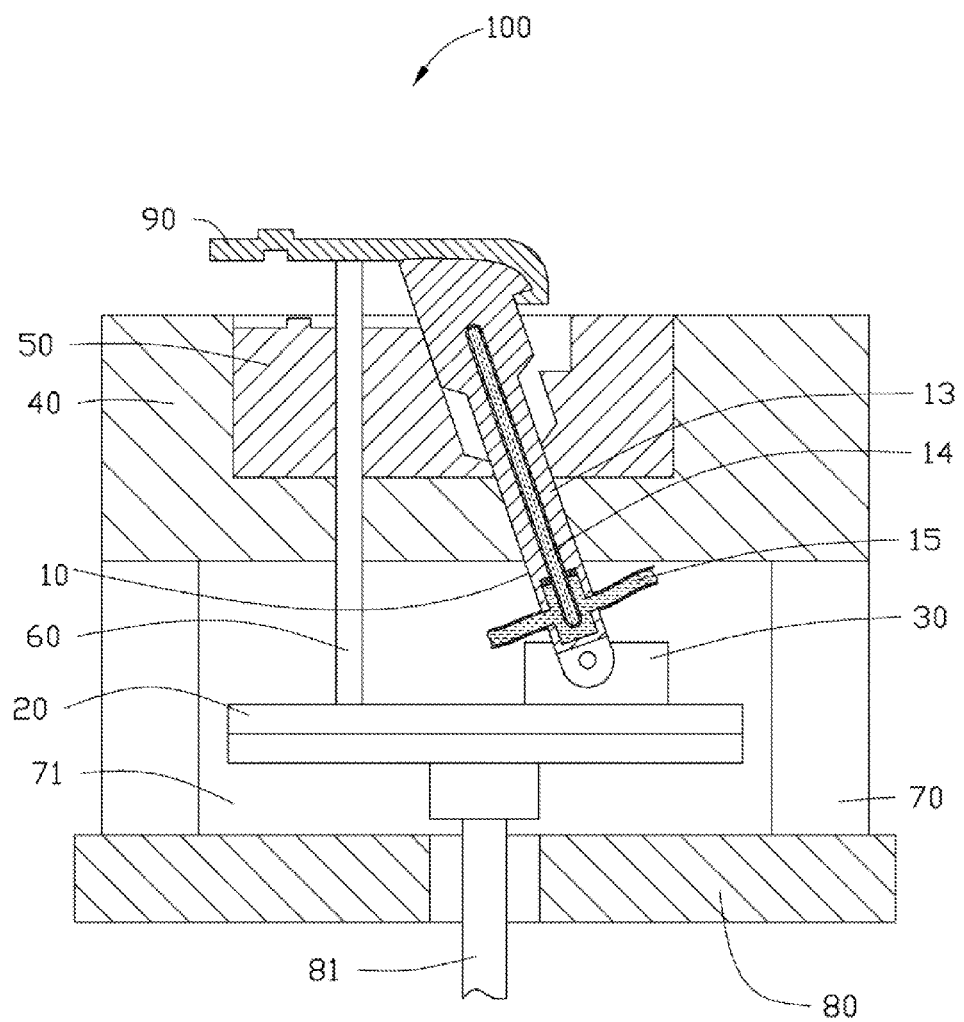
FIG. 2 is similar to FIG. 1, but omitting a female die and showing a finished product pushed out from a male die of the mold.

Referring to FIGS. 1 and 2, a mold 1000 in accordance with an exemplary embodiment of the present disclosure includes a male die 100 and a female die 200. When the male and female dies 100, 200 are engaged together, they cooperatively define a molding cavity 300 therebetween.

The female die 200 defines a hot sprue runner 201 through which a molten die material is injected into the molding cavity 300. The hot sprue runner 201 extends through the female die 200. The male die 100 includes a core plate 40, a core 50, a plurality of supporting blocks 70 and a bottom clamping plate 80. The core 50 is embedded in the core plate 40. The supporting blocks 70 are disposed between the bottom clamping plate 80 and the core plate 40. The supporting blocks 70 are arranged in a circle on a top face (not labeled) of the bottom clamping plate 80.

The supporting blocks 70, the bottom clamping plate 80 and the core plate 40 cooperatively form a receiving cavity 71. An ejector plate 20, a slider 30, part of an ejector pin 60, and part of a heat dissipating assembly 10 are received in the receiving cavity 71. The heat dissipating assembly 10 is pivotally connected to the slider 30. The slider 30 is slidably fixed on the ejector plate 20. The ejector pin 60 is fixed on the ejector plate 20.

The heat dissipating assembly 10 and the ejector pin 60 extend through the core plate 40 and the core 50 to a periphery of the molding cavity 300, where the heat dissipating assembly 10 and the ejector pin 60 form portions of physical boundaries of the molding cavity 300. The heat dissipating assembly 10 and the ejector pin 60 are each slidably engaged in the core plate 40 and the core 50. When the mold 1000 is in a closed position (referring to FIG. 1), a guide pin 81 is received in a recess (not labeled) formed in the bottom clamping plate 80, and tops of the ejector pin 60 and the heat dissipating assembly 10 are located at the bottom of the molding cavity 300. An enlarged top end of the guide pin 81 is connected to the ejector plate 20, and the guide pin 81 can drive the ejector plate 20 up and down. When the mold 1000 is moved from the closed position to an opened position (referring to FIG. 2), the ejector pin 60 and the heat dissipating assembly 10 are driven up by the guide pin 81 via the ejector plate 20. Thereby, the ejector pin 60 and the heat dissipating assembly 10 eject a finished product 90 made from the die material out of the molding cavity 300.

Figure 3:
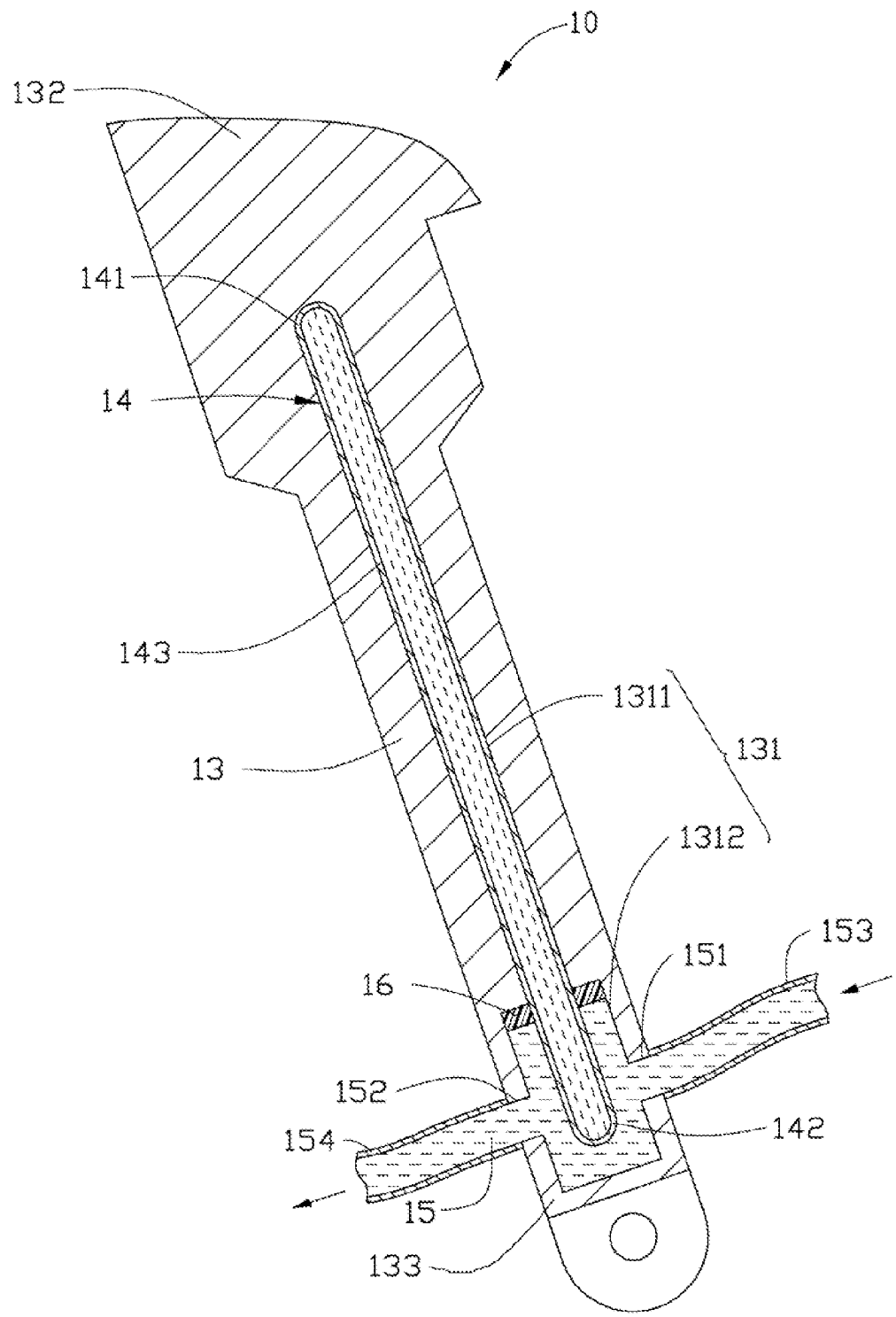
FIG. 3 is an enlarged view of a heat dissipating assembly of the mold shown in FIG. 1.

Referring to FIG. 3, the heat dissipating assembly 10 for dissipating heat generated by the mold 1000 includes an angular pin 13, a heat pipe 14 embedded in the angular pin 13, and a liquid passage 15 passing through the angular pin 13. The angular pin 13 defines an elongate receiving chamber 131 therein. The heat pipe 14 is received in the receiving chamber 131 of the angular pin 13.

The receiving chamber 131 of the angular pin 13 includes a first receiving portion 1311, and a second receiving portion 1312 extending from a bottom end (not labeled) of the first receiving portion 1311. The second receiving portion 1312 has a larger transverse cross-section than that of the first receiving portion 1311.

The heat pipe 14 includes a condensing section 142, an evaporation section 141, and a connecting section 143 interconnecting the condensing section 142 and the evaporation section 141. The first receiving portion 1311 of the angular pin 13 is shorter than the heat pipe 14. The total length of the evaporation section 141 and the connecting section 143 of the heat pipe 14 is identical to the length of the first receiving portion 1311 of the receiving chamber 131. The first receiving portion 1311 and the heat pipe 14 have an almost identical transverse cross-section.

The evaporation section 141 and the connecting section 143 of the heat pipe 14 are embedded in the first receiving portion 1311 of the receiving chamber 131. The evaporation section 141 of the heat pipe 14 is located in a first (top) end 132 of the angular pin 13 nearer the molding cavity 300. The condensing section 142 of the heat pipe 14 extends outwardly from the first receiving portion 1311 into the second receiving portion 1312 of the receiving chamber 131. The condensing section 142 of the heat pipe 14 is located in a second (bottom) end 133 of the angular pin 13 farther away from the molding cavity 300. In the present disclosure, there is a gap formed between the condensing section 142 and the bottom of the second receiving portion 1312 of the receiving chamber 131. In another embodiment, the condensing section 142 of the heat pipe 14 abuts against the bottom of the second receiving portion 1312 of the receiving chamber 131.

In a preferred embodiment, a good heat-conducting adhesive (not shown) is received in the first receiving portion 1311 of the receiving chamber 131, and the heat-conducting adhesive is distributed between an outer face of the heat pipe 14 and an inner face of the first receiving portion 1311 to reduce thermal resistance between the heat pipe 14 and the angular pin 13.

The liquid passage 15 includes an inlet tube 153 communicated with the second receiving portion 1312, and an outlet tube 154 also communicated with the second receiving portion 1312.

A first opening 151 is formed in a side wall (not labeled) of the second receiving portion 1312 corresponding to the inlet tube 153. The first opening 151 intercommunicates the inlet tube 153 and the second receiving portion 1312. A second opening 152 opposite to the first opening 151 is formed in another side wall (not labeled) of the second receiving portion 1312 corresponding to the outlet tube 154. The second opening 152 intercommunicates the outlet tube 154 and the second receiving portion 1312.

A sealing ring 16 is disposed at the joint of the first receiving portion 1311 and the second receiving portion 1312 of the receiving chamber 131, to form a liquid-tight seal that prevents liquid in the second receiving portion 1312 seeping into the first receiving portion 1311. The outer diameter of the sealing ring 16 is substantially the same as the inner diameter of the second receiving portion 1312. The sealing ring 16 also defines a through-hole (not labeled) through which the heat pipe 14 extends.

In use of the mold 1000, the majority of heat generated by the mold 1000 is transferred to the evaporation section 141 of the heat pipe 14 via the angular pin 13. In the present disclosure, the inlet tube 153 is connected to a remote liquid storage container (not shown), and the outlet tube 154 is connected to a remote liquid receiving container (not shown). Preferably, the liquid is water, ethanol, glycol or oil. The liquid flows into the inlet tube 153 from the liquid storage container, circulates around the condensing section 142 of the heat pipe 14 in the second receiving portion 1312, and flows out of the outlet tube 154 and to the liquid receiving container due to a difference in pressure existing between the liquid storage container and the liquid receiving container. Thereby, heat generated by the mold 1000 is dissipated.

In the present disclosure, the heat pipe 14 is embedded in the angular pin 13 according to the following exemplary method: providing an angular pin 13; forming a receiving chamber preform in the angular pin 13 by drilling, with an opening of the receiving chamber preform formed at the bottom of the angular pin 13, wherein the receiving chamber 131 includes a first receiving portion 1311 and a second receiving portion preform extending from one end of the first receiving portion 1311; embedding an evaporation section 141 and connecting section 143 of a heat pipe 14 in the first receiving portion 1311 of the receiving chamber 131, and sealing the opening at the bottom of the angular pin 13 by welding, thereby forming a second receiving portion 1312 of the receiving chamber 131.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A heat dissipating assembly of a mold, the heat dissipating assembly comprising:
    an angular pin defining a receiving chamber therein, the angular pin configured to be driven to slide in the mold by a guide pin;
    a heat pipe totally received in the receiving chamber of the angular pin, wherein the heat pipe comprises a condensing section, an evaporation section and a connecting section interconnecting the condensing section and the evaporation section; and
    a liquid passage formed in the mold and passing through a lower portion of the receiving chamber of the angular pin, wherein at least the evaporation section is embedded in an upper portion of the receiving chamber of the angular pin, and the condensing section is located in the lower portion of the receiving chamber.

2. The heat dissipating assembly of claim 1, further comprising a slider that is configured to pivot, the slider being slidably fixed on an ejector plate, and the ejector plate being supported on an distal end of the guide pin, wherein the receiving chamber of the angular pin comprises a first receiving portion and a second receiving portion extending from an end of the first receiving portion.

3. The heat dissipating assembly of claim 2, wherein the second receiving portion has a larger transverse cross-section than that of the first receiving portion.

4. The heat dissipating assembly of claim 3, wherein the first receiving portion and the heat pipe have substantially the same transverse cross-section.

5. The heat dissipating assembly of claim 3, wherein the first receiving portion is shorter than the heat pipe.

6. The heat dissipating assembly of claim 5, wherein the total length of the evaporation section and the connecting section of the heat pipe is identical to the length of the first receiving portion of the receiving chamber.

7. The heat dissipating assembly of claim 6, wherein the evaporation section and the connecting section of the heat pipe are embedded in the first receiving portion of the receiving chamber, and the condensing section of the heat pipe extends outwardly from the first receiving portion into the second receiving portion of the receiving chamber.

8. The heat dissipating assembly of claim 7, further comprising a gap defined between the condensing section of the heat pipe and the bottom of second receiving portion of the receiving chamber.

9. The heat dissipating assembly of claim 7, wherein the condensing section of the heat pipe abuts against the bottom of the second receiving portion of the receiving chamber.

10. The heat dissipating assembly of claim 3, further comprising a sealing ring disposed at the joint of the first receiving portion and the second receiving portion of the receiving chamber, the sealing ring forming a liquid-tight seal between the first and second receiving portions.

11. The heat dissipating assembly of claim 10, wherein the sealing ring defines a through-hole through which the heat pipe extends.

12. The heat dissipating assembly of claim 2, wherein the liquid passage comprises an inlet tube in liquid connection with the second receiving portion and an outlet tube also in liquid connection with the second receiving portion.

13. The heat dissipating assembly of claim 12, further comprising a first opening and a second opening formed in the side wall of the angular pin, wherein the first opening intercommunicates the inlet tube and the second receiving portion, and the second opening intercommunicates the outlet tube and the second receiving portion.

14. The heat dissipating assembly of claim 4, wherein a heat-conducting adhesive is received in the first receiving portion, and is distributed between an outer face of the heat pipe and an inner face of first receiving portion.

15. A mold comprising:
    a female die;

a male die, the male die and the female die when engaged together cooperatively defining a molding cavity therebetween;

a heat dissipating assembly slidably engaged in the male die and extending through the male die to a periphery of the molding cavity and configured to be driven to slide in the mold by a guide pin, the heat dissipating assembly comprising:

an angular pin defining a receiving chamber formed therein; and a heat pipe totally received in the receiving chamber of the angular pin, wherein the heat pipe comprises a condensing section, an evaporation section and a connecting section interconnecting the condensing section and the evaporation section; and a liquid passage passing through a lower portion of the receiving chamber of the angular pin;

wherein at least the evaporation section is embedded in an upper portion of the receiving chamber, and the condensing section is located in the lower portion of the receiving chamber.

16. The mold of claim 15, wherein the receiving chamber of the angular pin comprises a first receiving portion and a second receiving portion extending from an end of the first receiving portion.

17. The mold of claim 16, wherein the total length of the evaporation section and the connecting section is identical to the length of the first receiving portion of the receiving chamber.

18. The mold of claim 17, wherein the evaporation section and the connecting section of the heat pipe are embedded in the first receiving portion of the receiving chamber, and the condensing section of the heat pipe extends outwardly from the first receiving portion into the second receiving portion of the receiving chamber.

19. The mold of claim 16, further comprising a slider located in the male die, wherein the heat dissipating assembly is pivotally connected to the slider.

20. The mold of claim 19, further comprising an ejector plate located in the male die, wherein the slider is slidably fixed on the ejector plate.

\* \* \* \* \*